United States Patent
Hikihara et al.

(10) Patent No.: US 9,136,911 B2
(45) Date of Patent: Sep. 15, 2015

(54) POWER LINE COMMUNICATION DEVICE, POWER SUPPLY CIRCUIT WITH COMMUNICATION FUNCTION, ELECTRIC APPLIANCE, AND CONTROL AND MONITORING SYSTEM

(75) Inventors: Takashi Hikihara, Nagaokakyo (JP); Tsuguhiro Takuno, Kyoto (JP); Kenichi Hirotsu, Osaka (JP); Takefumi Shimoguchi, Osaka (JP); Toshikazu Shibata, Osaka (JP); Takashi Tsuno, Osaka (JP); Satoshi Hatsukawa, Osaka (JP)

(73) Assignees: SUMITOMO ELECTRIC INDUSTRIES, LTD., Osaka (JP); KYOTO UNIVERSITY, Kyoto (JP)

( * ) Notice: Subject to any disclaimer, the term of this patent is extended or adjusted under 35 U.S.C. 154(b) by 849 days.

(21) Appl. No.: 13/388,878

(22) PCT Filed: Aug. 4, 2010

(86) PCT No.: PCT/JP2010/063146
§ 371 (c)(1),
(2), (4) Date: Feb. 3, 2012

(87) PCT Pub. No.: WO2011/016466
PCT Pub. Date: Feb. 10, 2011

(65) Prior Publication Data
US 2012/0128081 A1 May 24, 2012

(30) Foreign Application Priority Data
Aug. 6, 2009 (JP) .................................. 2009-183745

(51) Int. Cl.
G08C 19/12 (2006.01)
H04B 3/56 (2006.01)
H04B 3/54 (2006.01)

(52) U.S. Cl.
CPC .. H04B 3/56 (2013.01); H04B 3/54 (2013.01); H04B 2203/547 (2013.01); H04B 2203/5458 (2013.01)

(58) Field of Classification Search
CPC .............................. H05B 37/0263; H04B 3/54
USPC .................. 340/13.23, 12.32, 310.11, 310.12; 307/29, 37, 38–41, 140; 375/257–260; 700/286–298
See application file for complete search history.

(56) References Cited

U.S. PATENT DOCUMENTS 4,210,901 A * 7/1980 Whyte et al. .................... 340/9.1
4,360,881 A * 11/1982 Martinson ..................... 700/298
(Continued)

FOREIGN PATENT DOCUMENTS

JP 10-255003 A 9/1998
JP 2007-081845 A 3/2007
(Continued)

OTHER PUBLICATIONS

"Current State of Power Line Transmission (PLC: Power Line Communication)", Kiyoshi Eto, Interface, pp. 70-81, CQ Publishing Co., Ltd., Sep. 2000.
(Continued)

Primary Examiner — Ariel Balaoing
Assistant Examiner — Kam Ma
(74) Attorney, Agent, or Firm — McDermott Will & Emery LLP

(57) ABSTRACT

To realize a transmission function of power line communication by a further simplified and cost-effective circuit configuration, in a PLC modem installed in an electric appliance such as a household electrical appliance. A semiconductor switching element that is present on an electric circuit connected to a power line is driven by a modulator unit. The modulator unit controls ON/OFF operations of the semiconductor switching element, to thereby cause a communication signal of a modulated rectangular wave to be output to the power line for a prescribed period.

8 Claims, 5 Drawing Sheets

(56) References Cited

U.S. PATENT DOCUMENTS

| | | | | |
|---|---|---|---|---|
| 4,475,209 | A | * | 10/1984 | Udren .................. 375/214 |
| 5,227,762 | A | * | 7/1993 | Guidette et al. ........... 340/12.34 |
| 7,501,913 | B2 | * | 3/2009 | Hanada et al. ................ 333/132 |
| 8,049,599 | B2 | * | 11/2011 | Sutardja ................... 340/12.33 |
| 2007/0087722 | A1 | * | 4/2007 | Ichihara .................... 455/343.1 |
| 2008/0075177 | A1 | * | 3/2008 | Noh ............................ 375/258 |
| 2010/0136911 | A1 | * | 6/2010 | Sekita et al. ................. 455/41.2 |
| 2011/0026621 | A1 | * | 2/2011 | Kim et al. .................... 375/260 |
| 2011/0222595 | A1 | * | 9/2011 | Choi et al. ................... 375/238 |
| 2012/0128081 | A1 | * | 5/2012 | Hikihara et al. ............. 375/257 |
| 2012/0300860 | A1 | * | 11/2012 | Washiro ....................... 375/257 |
| 2013/0182781 | A1 | * | 7/2013 | Matsutani .................... 375/257 |
| 2013/0314219 | A1 | * | 11/2013 | Van Laanen ............... 340/12.32 |

FOREIGN PATENT DOCUMENTS

| | | |
|---|---|---|
| JP | 2008-011645 A | 1/2008 |
| JP | 2008-048012 A | 2/2008 |
| JP | 2008-245408 A | 10/2008 |
| JP | 2009-093125 A | 4/2009 |
| JP | 2012090097 A * | 5/2012 |

OTHER PUBLICATIONS

Office Action issued in Japanese Patent Application No. 2009-183745 dated May 28, 2013.

* cited by examiner

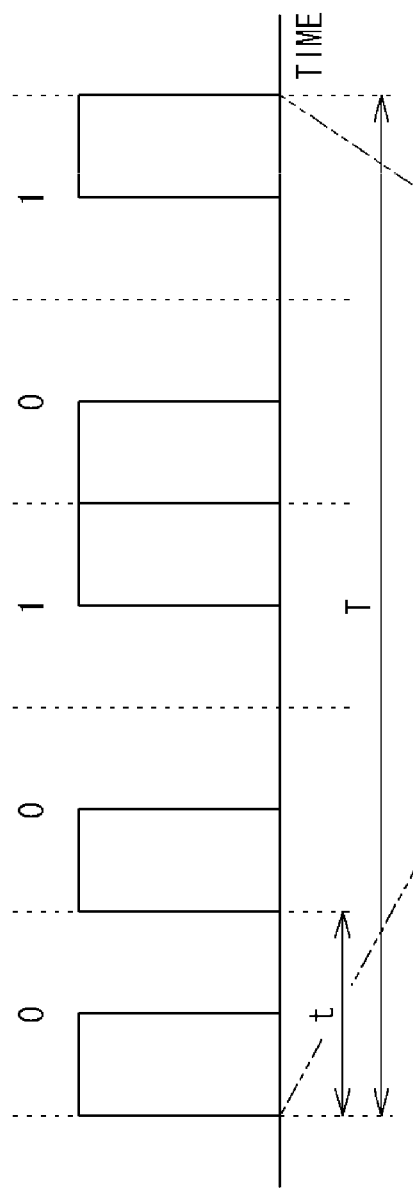
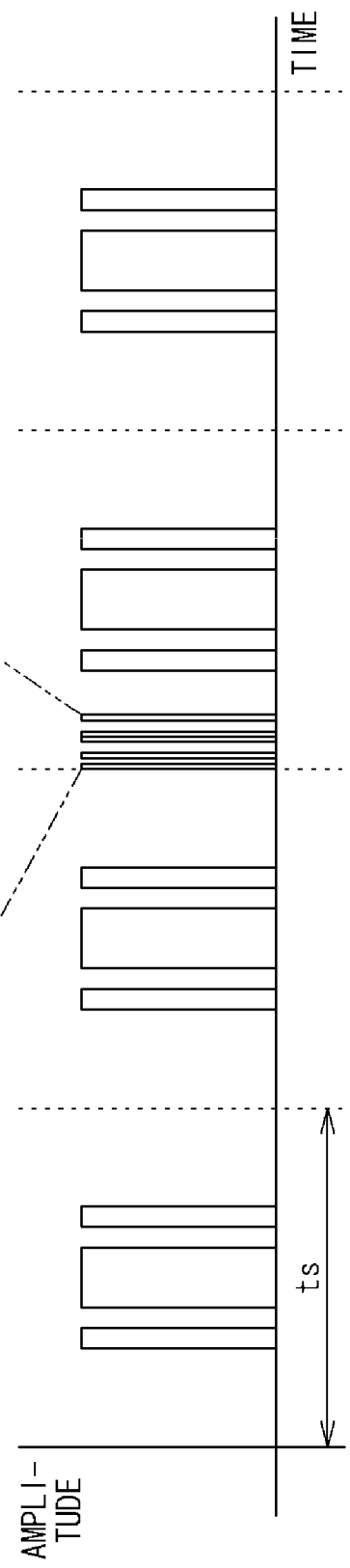
FIG. 3A
FIG. 3B

POWER LINE COMMUNICATION DEVICE, POWER SUPPLY CIRCUIT WITH COMMUNICATION FUNCTION, ELECTRIC APPLIANCE, AND CONTROL AND MONITORING SYSTEM

RELATED APPLICATIONS

This application is the U.S. National Phase under 35 U.S.C. §371 of International Application No. PCT/JP2010/063146, filed on Aug. 4, 2010, which in turn claims the benefit of Japanese Application No. 2009-183745, filed on Aug. 6, 2009, the disclosures of which Applications are incorporated by reference herein.

TECHNICAL FIELD

The present invention relates to a power line communication device that uses a power line as a signal transmission path, a power supply circuit having installed therein a function of power line communication, an electric appliance, and a control and monitoring system.

BACKGROUND ART

The technique of structuring a network in a home area by the power line communication (PLC: Power Line Communication) is already in practical use. Such power line communication makes it possible to establish communication between PLC modems (power line communication devices) each connected to an outlet, in which a power line (domestic wiring) is used as a signal transmission path. Accordingly, without the necessity of laying a dedicated communication cable in the home area, a wired LAN (local area network) can be structured (for example, see Non Patent Literature 1). To each PLC modem, an appliance having an information communication function, such as a personal computer, is connected via a communication line. Further, not being limited to the personal computer, it is also possible to connect a household electrical appliance, which has added functions of receiving external control and providing information externally, to the PLC modem, so as to be included in the network (for example, see Patent Literature 1).

However, it is troublesome to purchase and install a PLC modem per household electrical appliance. Also, it is inconvenient that the PLC modem occupies one outlet. Further, there is a case where installation of the PLC modem is physically difficult, such as on a wall surface or the like. Accordingly, it is preferable that a household electrical appliance previously includes a PLC modem, from the viewpoint of functionality and of promoting the prevalence of the PLC.

FIG. 5 is a diagram showing a circuit configuration example of a case where a PLC modem is installed in a household electrical appliance. With reference to the drawing, household electrical appliance 63 often includes power supply circuit 62 for supplying a DC power supply voltage to an electronic circuit which is installed for a control purpose. Power supply circuit 62 converts a commercial AC voltage supplied via plug 63p into a prescribed DC voltage. PLC modem 61 is connected in parallel on the primary side of power supply circuit 62, and is connected to power line 65 by plug 63p being inserted into outlet 64.

PLC modem 61 is structured with PLC modem circuit unit 611, high frequency transformer 612 for coupling with the power line, and capacitors 613. Further, PLC modem circuit unit 611 is structured with a digital communication processing unit, a modulator unit, a demodulator unit, and a line driver (analog amplifier) and the like, each of which is not shown.

As described above, when PLC modem 61 is installed in household electrical appliance 63, there is a problem that household electrical appliance 63 is associated with complication of the circuitry and an increase in costs. Accordingly, how to simplify the circuitry and suppress in an increase in the cost becomes the problem to be solved.

CITATION LIST

Patent Literature

Patent Literature 1: Japanese Publication of Unexamined Patent Application No. 2008-48012 (FIG. 1 and FIG. 2)

NON PATENT LITERATURE

Non Patent Literature 1: "Current State of Power Line Transmission (PLC: Power Line Communication)", Kiyoshi ETO, Interface, pages 70 to 81, CQ Publishing Co., Ltd., September, 2000

SUMMARY OF INVENTION

In consideration of the problem stated above, an object of the present invention is to realize a transmission function of power line communication with a further simplified and cost-effective circuit configuration in a PLC modem installed in an electric appliance such as a household electrical appliance or the like.

(1) The present invention is a power line communication device that uses a power line as a signal transmission path. The power line communication device includes: a semiconductor switching element that is present on an electric circuit connected to the power line; and a modulator unit that controls ON/OFF operations of the semiconductor switching element, to thereby cause a communication signal of a modulated rectangular wave to be output to the power line for a prescribed period.

With the power line communication device structured as above, by switching the semiconductor switching element in the ON/OFF operation mode modulated based on a signal of the power line communication to be transmitted, the signal can be transmitted to other power line communication device via the power line. Accordingly, a line driver (analog amplifier) or a high frequency transformer for sending a signal of the power line communication on a power line is not required.

(2) Further, in the power line communication device, the semiconductor switching element may also be used for performing switching in a power supply circuit supplied with an AC voltage from the power line, and the modulator unit may cause the semiconductor switching element to output the communication signal in an unoccupied time not being occupied with a power signal from the power supply circuit.

In this case, the power line communication device can be structured using the power supply circuit.

(3) On the other hand, the present invention is a power supply circuit that performs an AC/DC conversion by switching based on an AC voltage supplied from a power line. The power supply circuit includes: a semiconductor switching element that performs the switching; a demodulator unit that extracts and demodulates a signal of power line communication that is transmitted using the power line as a signal transmission path; and a modulator unit that uses an unoccupied time of switching for the AC/DC conversion to control ON/OFF operations of the semiconductor switching element, to thereby cause a communication signal of a modulated rectangular wave to be output to the power line for a prescribed period.

With the power supply circuit with the communication function structured as above, by switching the semiconductor switching element in the ON/OFF operation mode having undergone the phase modulation based on a signal of the power line communication to be transmitted, a signal of the power line communication can be transmitted via the power line. Accordingly, a line driver or a high frequency transformer for sending a signal of the power line communication on the power line is not required. Further, use of the power supply circuit eliminates the necessity of parallel use of a power supply unit dedicated to the power line communication function. Still further, the semiconductor switching element of the power supply circuit can be used.

(4) Further, in the power supply circuit with a communication function described in (3), it is preferable that, in series to a capacitor that is used for rectification in the power supply circuit, an LC parallel circuit made up of an inductor and a capacitor is inserted, and the LC parallel circuit has its inductance and capacitance set such that parallel resonance occurs at a switching frequency for the power line communication.

In this case, since the impedance of the LC parallel circuit becomes extremely great due to the parallel resonance, short-circuiting between the rectified-voltage output terminals can be prevented.

(5) Further, in the power supply circuit with a communication function described in (3), it is preferable that the semiconductor switching element uses one of an SiC transistor, a GaN transistor, and a diamond transistor.

In this case, these transistors all involve just a small switching loss. Therefore, even when the switching for the power line communication is added to the inherent switching, a reduction in the conversion efficiency as a power supply circuit can be suppressed.

(6) Further, the power supply circuit with a communication function described in (3) may be integrated into modules so as to be installable in an electric appliance.

In this case, by installing the power supply circuit integrated as modules in various electric appliances, the function of the power line communication can be added with ease.

(7) Further, an electric appliance of the present invention having installed therein the power supply circuit with a communication function described in (3) may include information on its own power consumption in the communication signal.

In this case, the information on the power consumption can easily be provided to a management appliance (a central control and monitoring device, a personal computer or the like).

(8) Further, an electric appliance of the present invention having installed therein the power supply circuit with a communication function described in (3) may control its own operation or perform its own electric power management based on a signal of the power line communication obtained by modulation.

In this case, the electric appliance can be the target of the remote control or the electric power management based on the power line communication.

(9) Further, the present invention as a control and monitoring system structures a network of power line communication with: an electric appliance that has installed therein the power supply circuit with a communication function described in (3), that includes information on its own power consumption in the communication signal, and that is capable of controlling its own operation or performing its own electric power management based on a signal of the power line communication obtained by modulation; and a management appliance that has the function of the power line communication. The management appliance controls and monitors information of the electric appliance.

In this case, without the necessity of additionally providing a line dedicated to communication, a management appliance (a central control and monitoring device, a personal computer or the like) can centrally control or monitor electric appliances.

BRIEF DESCRIPTION OF DRAWINGS

FIG. 3A is a diagram schematically showing one example of a pulse signal that drives a semiconductor switching element for power line communication, and FIG. 3B is a diagram showing switching of a power supply circuit, in which the pulse signal shown in FIG. 3A is included;

DESCRIPTION OF EMBODIMENTS

Figure 1:
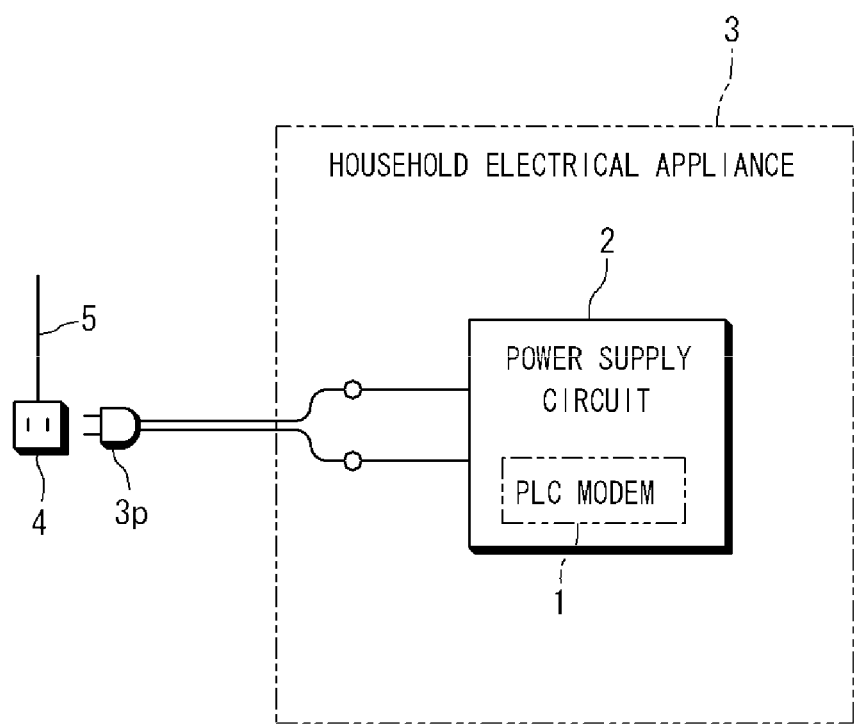
FIG. 1 is a diagram showing the schematic configuration of a power line communication device (PLC modem) and a power supply circuit with a communication function based on power line communication according to one embodiment of the present invention.

FIG. 1 is a diagram showing the schematic configuration of a power line communication device (hereinafter referred to as a PLC modem) and a power supply circuit with a communication function based on power line communication according to one embodiment of the present invention. That is, PLC modem 1 is installed in power supply circuit 2, and power supply circuit 2 is installed in household electrical appliance 3, for example. By plug 3p connected to the primary side of power supply circuit 2 being inserted into outlet 4, power supply circuit 2 is supplied with a commercial AC voltage (AC 100 V) from power line 5, and PLC modem 1 can perform the power line communication.

Figure 2:
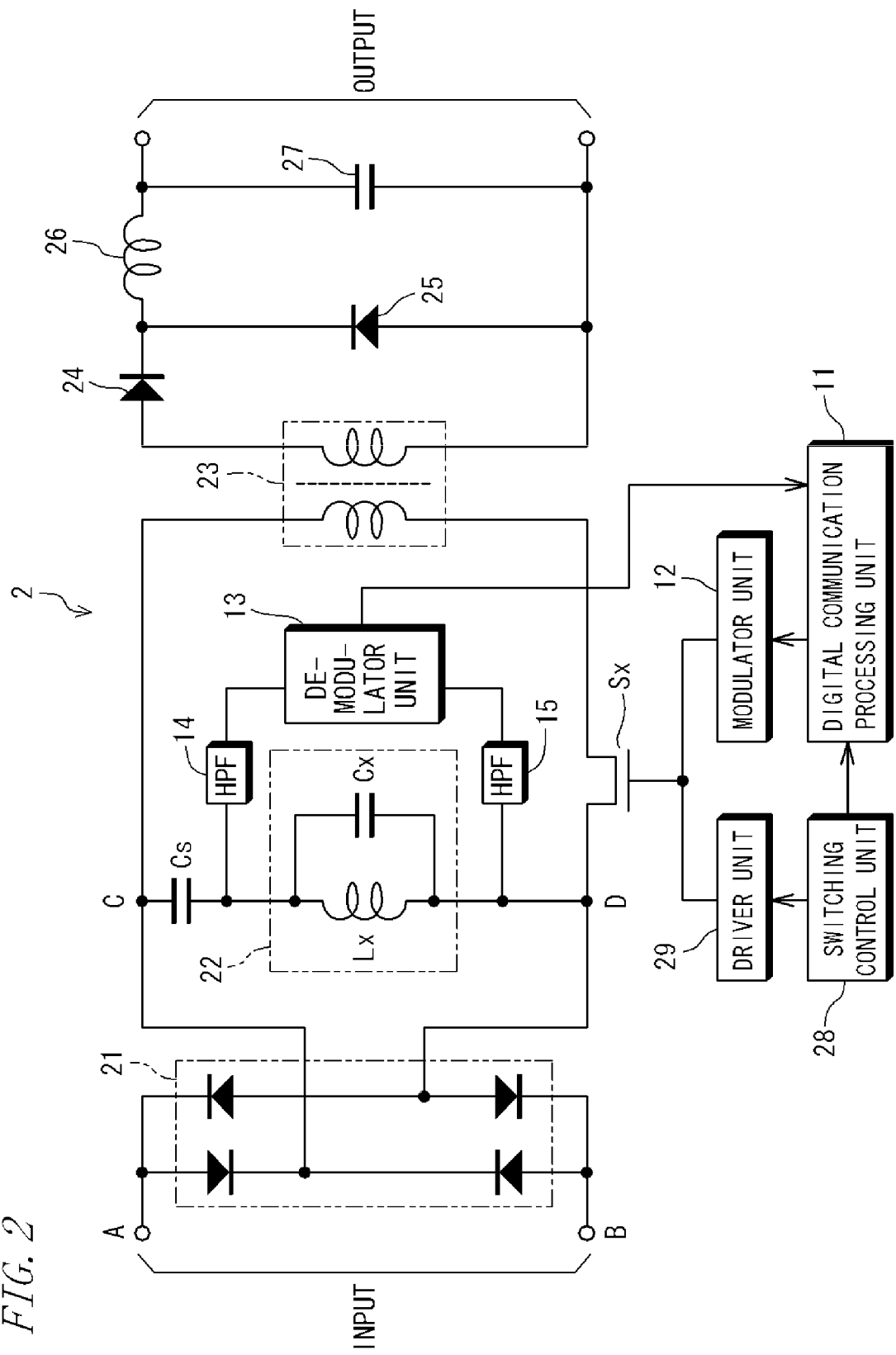
FIG. 2 is a circuit diagram showing the internal configuration of the power supply circuit.

FIG. 2 is a circuit diagram showing the internal configuration of power supply circuit 2. Power supply circuit 2 uses the commercial AC voltage as the input voltage, and provides a prescribed DC output voltage (for example, DC 16 V) by performing rectification and AC/DC conversion by switching. Specifically, power supply circuit 2 structures a forward converter by connecting bridge circuit 21 structured by four diodes, a capacitor Cs used for rectification, LC parallel circuit 22, semiconductor switching element Sx, transformer 23, two diodes 24 and 25, choke coil 26, and smoothing capacitor 27, as shown in the drawing.

LC parallel circuit 22 is made up of inductor Lx (inductance: Lx) and capacitor Cx (capacitance: Cx) connected in parallel to each other. The foregoing components except for LC parallel circuit 22 are inherently required as a power supply circuit.

It is to be noted that, the function of diodes in bridge circuit 21, and diodes 24, 25 can be realized by replacing with the transistors such as FETs and performing synchronous rectification.

Further, as semiconductor switching element Sx, a transistor suitable for switching at high frequencies (2 MHz or more), or a junction FET, a MOS-FET and the like are used. To the control terminal (base, gate) of semiconductor switching element Sx, driver unit 29 and modulator unit 12 are connected in parallel. Driver unit 29 operates upon reception of a drive instruction from switching control unit 28. Modulator unit 12 operates upon reception of a modulation instruction from digital communication processing unit 11.

Further, switching control unit 28 instructs the timing of switching performed by driver unit 29 and an unoccupied time (which will be detailed later) to digital communication processing unit 11, such that the output of driver unit 29 and the output of modulator unit 12 are not simultaneously provided. As shown in the drawing, to the opposite ends of LC parallel circuit 22, demodulator unit 13 is connected via high-pass filters 14 and 15. The output signal from demodulator unit 13 is sent to digital communication processing unit 11.

First, a description will be given of an inherent function of the power supply circuit in power supply circuit 2. When semiconductor switching element Sx in an OFF state enters an ON state by the output of driver unit 29, by the voltage rectified by bridge circuit 21, a counter electromotive force is generated at the primary-side winding of transformer 23, and an induced electromotive force is generated at the secondary-side winding. Thus, a current flows through a load (not shown) via diode 24, and the energy is stored in choke coil 26.

Next, when semiconductor switching element Sx enters an OFF state, choke coil 26 discharges the stored energy so as to avoid variations in the current, and the current flows through the load via diode 25. Through the repetition of this procedure, the power is supplied to the load. The switching frequency is of relative low frequencies, i.e., about several ten kHz to several hundred kHz.

Next, a description will be given of the function of the power line communication in power supply circuit 2.

First, as to reception, a signal of the power line communication (high frequencies of 2 MHz to 30 MHz) imposed on the power line is demodulated by demodulator unit 13 via high-pass filters 14 and 15. The demodulated signal is decoded by digital communication processing unit 11.

On the other hand, transmission is carried out by switching semiconductor switching element Sx by digital communication processing unit 11 via modulator unit 12. The switching is carried out at a high frequency of 2 MHz or more.

FIG. 3A is a diagram schematically showing one example of a pulse signal (transmission signal) that drives the semiconductor switching element Sx for the power line communication. This signal is a digital signal having undergone the phase modulation. That is, the signal basically represents information of two bits based on the change in the timing of ON/OFF of the pulse (rectangular wave) in a unit time (=one cycle t). When an ON state is entered at the start of a cycle t and an OFF state is entered at the time point of ½ cycle, it represents "0". Conversely, when an ON state is entered at the time point of ½ cycle and an OFF state is entered at the time point at the end of the one cycle, it represents "1".

For example, when the signal (information) of the power line communication to be transmitted is "00101", modulator unit 12 outputs a pulse signal shown in FIG. 3A. Thus, modulator unit 12 causes semiconductor switching element Sx to turn ON/OFF within a unit time (=t) at a certain cycle t during a prescribed period T, and carries out phase modulation by changing the timing of causing ON/OFF in one cycle t based on the signal of the power line communication to be transmitted.

FIG. 3B is a diagram showing switching of power supply circuit 2 including the pulse signal shown in FIG. 3A. The inherent switching as a power supply circuit is carried out at a certain cycle ts based on a PWM (pulse width modulation) pulse shown as a power signal. The PWM pulse will not occupy the entire one cycle ts, and there is always an unoccupied time at each of the initial stage and the final stage of one cycle ts. Accordingly, using the unoccupied time, for example as shown in the drawing, a pulse signal of the power line communication shown in FIG. 3A is inserted at the initial stage of one cycle.

It is to be noted that, as described above, since the signal frequency of the power line communication is of far higher frequencies than the inherent switching frequency of the power supply circuit, the transmission time T is very short. Further, digital communication processing unit 11 shown in FIG. 2 causes modulator unit 12 to operate in synchronization with switching control unit 28. Therefore, a signal can be inserted accurately in the targeted unoccupied time.

By the insertion of the signal described above, semiconductor switching element Sx is switched, and a signal of the power line communication is sent to power line 5 (FIG. 1) via bridge circuit 21. In this manner, semiconductor switching element Sx plays a role of an oscillator that sends a signal of the power line communication betweentimes the inherent switching operations carried out for AC/DC conversion.

Though the frequency of performing the signal insertion differs depending on the amount of information being transmitted, once every second will suffice when the information is, e.g., numerical value data. Accordingly, the effect of the signal insertion on the conversion efficiency as a power supply circuit can be suppressed to the negligible extent.

As described above, PLC modem 1 or power supply circuit 2 having that function switches semiconductor switching element Sx in an ON/OFF mode having undergone the phase modulation based on the signal of the power line communication to be transmitted, to thereby achieve transmission of the signal to other PLC modem (or the power supply circuit or the household electrical appliance) via power line 5. Accordingly, a line driver (analog amplifier) or a high frequency transformer for sending a signal of the power line communication to the power line is not required. Thus, the transmission function of the power line communication can be realized with a simplified and cost-effective circuit configuration.

Further, use of power supply circuit 2 eliminates the necessity of parallel use of a power supply unit dedicated to the power line communication function. Still further, since semiconductor switching element Sx of power supply circuit 2 can be used, the function of the power line communication can be realized with further simplified and cost-effective circuit configuration.

It is to be noted that, LC parallel circuit 22 has its inductance and capacitance set such that parallel resonance occurs at the switching frequency for power line communication. That is, $$fs = 1/\{2\pi \cdot (Lx \cdot Cx)^{1/2}\}$$

where fs is the switching frequency for the power line communication. In this case, the impedance of LC parallel circuit 22 becomes extremely great due to the parallel resonance. Accordingly, even when the impedance of the capacitor Cs approaches 0 at high frequencies, short-circuiting between rectified-voltage output terminals C-D in FIG. 2 can be prevented.

Further, it is necessary to adjust the Q-value of the resonance of Lx and Cx such that the common mode current flowing through the input terminals A and B shown in FIG. 2 falls within a range of acceptable values (2 to 15 MHz: 30 dBμA, 15 to 30 MHz: 20 dBμA) of the power line communication prescribed by the Radio Law.

It is to be noted that, the frequency used in the power line communication may be a single frequency. Alternatively, it may be a plurality of frequencies or OFDM (Orthogonal Frequency Division Multiplexing). However, when the frequency band being used is wide, LC parallel circuit 22 (one inductor Lx and one capacitor Cx) as shown in FIG. 2 is not suitable, and a plurality of LC parallel circuits differing in resonance frequency must further be connected in parallel.

It is to be noted that, in a case where a transistor is used as semiconductor switching element Sx, it is preferable to use an SiC transistor, a GaN transistor, or a diamond transistor. These transistors all involve just a small switching loss. Therefore, even when the switching for the power line communication is added to the inherent switching, a reduction in the conversion efficiency as a power supply circuit can be suppressed.

It is to be noted that, it is preferable that power supply circuit 2 with a communication function as described above is integrated in modules (e.g., finished parts that are stored in a case or the like as the power supply unit).

In this case, by installing power supply circuit 2 integrated as modules to various household electrical appliances or other electric appliances, the function of the power line communication can be added with ease.

Figure 4:
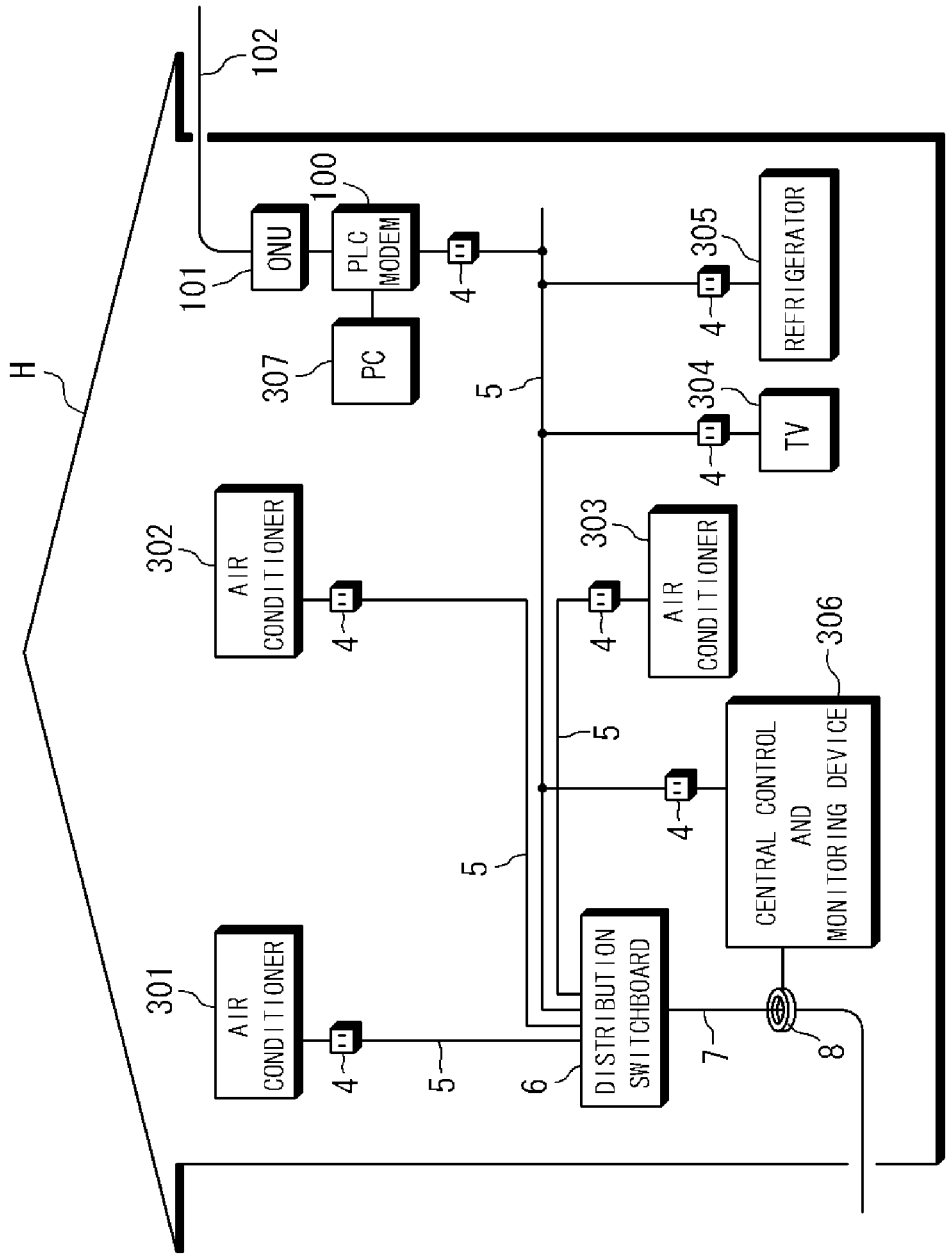
FIG. 4 is a diagram showing one example of a home area network based on the power line communication.
Figure 5:
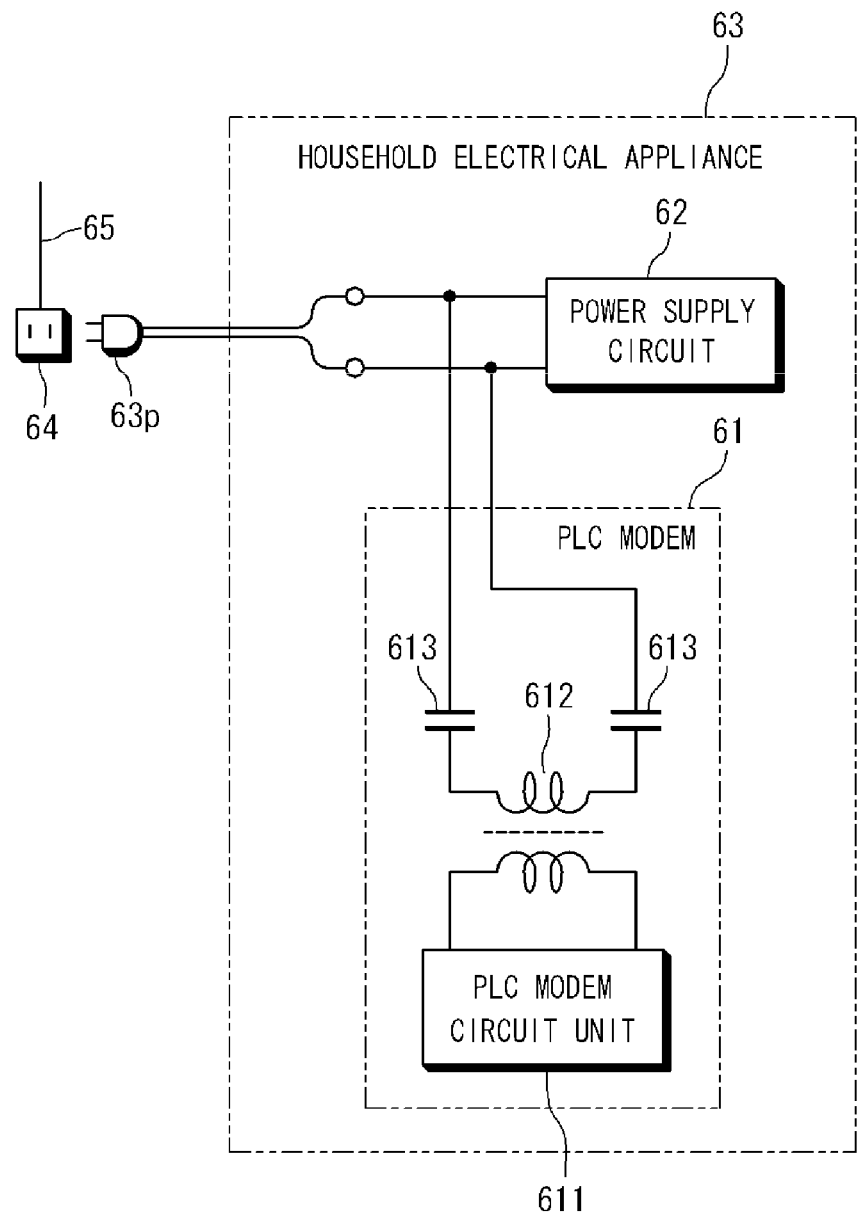
FIG. 5 is a diagram showing a circuit configuration example in a case where a PLC modem is included in a household electrical appliance.

FIG. 4 is a diagram showing one example of a home area network based on the power line communication. In this house H, PLC modem 100 is connected to ONU (Optical Network Unit) 101 provided at the end of optical fiber 102. Power lines (domestic wiring) 5 of the home area are connected to one another through distribution switchboard 6. Distribution switchboard 5 is connected to an external power line via incoming line 7. At several points in power lines 5, outlets 4 are provided.

By connecting PLC modem 100 to outlet 4, power lines 5 stretched in the home area can be used as signal transmission paths based on the power line communication. Further, by connecting electric appliances, such as various home area household electrical appliances having installed therein power supply circuit 2 with the communication function as described above, to outlets 4, a LAN based on the power lines can be structured. Here, for example, air conditioners 301 to 303, television set 304, refrigerator 305, and central control and monitoring device 306 are the electric appliances having installed therein power supply circuit 2 with the communication function.

Personal computer 307 is connected to PLC modem 100 so as to be capable of establishing communication. However, installing power supply circuit 2 with the communication function in personal computer 307, it is possible to establish communication via the power line. The current passing through incoming line 7 can be detected by current detector 8, and the output is sent to central control and monitoring device 306.

In the configuration as shown in FIG. 4, personal computer 307 can establish an Internet connection through PLC modem 100 and ONU 101 via optical fiber 102. Further, television set 304 is capable of receiving video distribution from optical fiber 102 via power line 5, for example.

Further, the home area network is structured for the purpose of controlling or monitoring the electric power. For example, the target of control and monitoring is air conditioners whose power consumption is great. Air conditioners 301 to 303 have a function of providing information on the power consumption of themselves, and the information is sent to each power line 5 using the function of PLC modem 1 installed in power supply circuit 2. Further, air conditioners 301 to 303 each have a function of externally receiving a signal that controls the operation of air conditioners 301 to 303, and they can receive the signal by the function of PLC modem 1 installed in power supply circuit 2.

On the other hand, central control and monitoring device 306 is capable of receiving a signal from power line 5 using the function of PLC modem 1 installed in power supply circuit 2. Accordingly, it is capable of monitoring the power consumption of air conditioners 301 to 303 in the home area, and having it displayed as necessary. Further, central control and monitoring device 306 is capable of detecting the power consumption of the whole home area, based on the output of current detector 8. Still further, central control and monitoring device 306 has information on the acceptable power consumption (which is preset as the maximum power that can be used from the viewpoint of saving energy, for example) in the home area.

When the power consumption of the home area exceeds the acceptable power consumption, the central control and monitoring device 306 stops at least one of operating air conditioners 301 to 303. Specifically, central control and monitoring device 306 transmits a stop signal to the air conditioner desired to be stopped, and the air conditioner receiving the signal can stop its operation by causing semiconductor switching element Sx of power supply circuit 2 to enter an OFF state continuously. Further, when the power consumption of the home area reduces and becomes significantly smaller than the acceptable power consumption, the stopped air conditioner can be activated again. In this manner, the household electrical appliance can remotely be controlled based on the power line communication.

It is to be noted that, central control and monitoring device 306 is one example of the management appliance as to the control and monitoring of the electric power in the network. Such a function can also be realized by a personal computer. Further, the control and monitoring system structured with such a management appliance and an electric appliance being the target of control and monitoring can be applied to various electric appliances as such targets, without being limited to air conditioners. Still further, such a control and monitoring system can be structured at an office or a factory, without being limited to the home area.

It is to be noted that the embodiment disclosed herein should be construed as an example in every respect, and not as a limitation. It is intended that the scope of the present invention is shown by the description of the claims, and includes any modification being equivalent to the meaning and the scope of the description of the claims.

For example, the present communication scheme is applicable not only to AC power supply lines, but also to DC power supply lines by dispensing with bridge circuit 21. Further, it is also applicable to FSK, QPSK, QAM, OFDM, SS (Spread Spectrum) modulation, without being limited to phase modulation.

INDUSTRIAL APPLICABILITY

With the power line communication device of the present invention, a line driver or a high frequency transformer for sending a signal of the power line communication to the power line can be dispensed with. Thus, the transmission function of the power line communication can be realized with a simplified and inexpensive circuit configuration.

Further, with the power supply circuit with the communication function of the present invention, in addition to the advantage that the line driver or the high frequency transformer for sending a signal of the power line communication to the power line can be dispensed with, use of the power supply circuit makes it possible to provide a power supply circuit that realizes the function of the power line communication with further simplified and cost-effective circuit configuration. The same holds true for the electric appliance and the control and monitoring system of the present invention.

The invention claimed is:

1. A power line communication device that uses a power line as a signal transmission path, comprising:
    a semiconductor switching element that is present on an electric circuit connected to the power line and is used for performing switching in a power supply circuit supplied with an AC voltage from the power line; and
    a modulator unit that controls ON/OFF operations of the semiconductor switching element in an unoccupied time not being occupied with a power signal from the power supply circuit, to thereby cause a communication signal of a modulated rectangular wave to be output to the power line for a prescribed period.

2. A power supply circuit with a communication function that performs an AC/DC conversion by switching based on an AC voltage supplied from a power line, comprising:
    a semiconductor switching element that performs the switching;
    a demodulator unit that extracts and demodulates a signal of power line communication that is transmitted using the power line as a signal transmission path; and
    a modulator unit that uses an unoccupied time of switching for the AC/DC conversion to control ON/OFF operations of the semiconductor switching element, to thereby cause a communication signal of a modulated rectangular wave to be output to the power line for a prescribed period.

3. The power supply circuit with a communication function according to claim 2, wherein
    in series to a capacitor that is used for rectification in the power supply circuit, an LC parallel circuit made up of an inductor and a capacitor is inserted, and
    the LC parallel circuit has its inductance and capacitance set such that parallel resonance occurs at a switching frequency for the power line communication.

4. The power supply circuit with a communication function according to claim 2, wherein
    the semiconductor switching element uses one of an SiC transistor, a GaN transistor, and a diamond transistor.

5. The power supply circuit with a communication function according to claim 2, wherein
    the power supply circuit is integrated into modules so as to be installable in an electric appliance.

6. An electric appliance having installed therein the power supply circuit with a communication function according to claim 2, wherein
    the electric appliance includes information on its own power consumption in the communication signal.

7. An electric appliance having installed therein the power supply circuit with a communication function according to claim 2, wherein
    the electric appliance controls its own operation or performs its own electric power management based on a signal of the power line communication obtained by modulation.

8. A control and monitoring system structuring a network of power line communication with: an electric appliance that has installed therein the power supply circuit with a communication function according to claim 2, that includes information on its own power consumption in the communication signal, and that is capable of controlling its own operation or performing its own electric power management based on a signal of the power line communication obtained by modulation; and a management appliance that has the function of the power line communication, wherein
    the management appliance controls the electric appliance and monitors the information of the electric appliance.

\* \* \* \* \*